Figure 1:
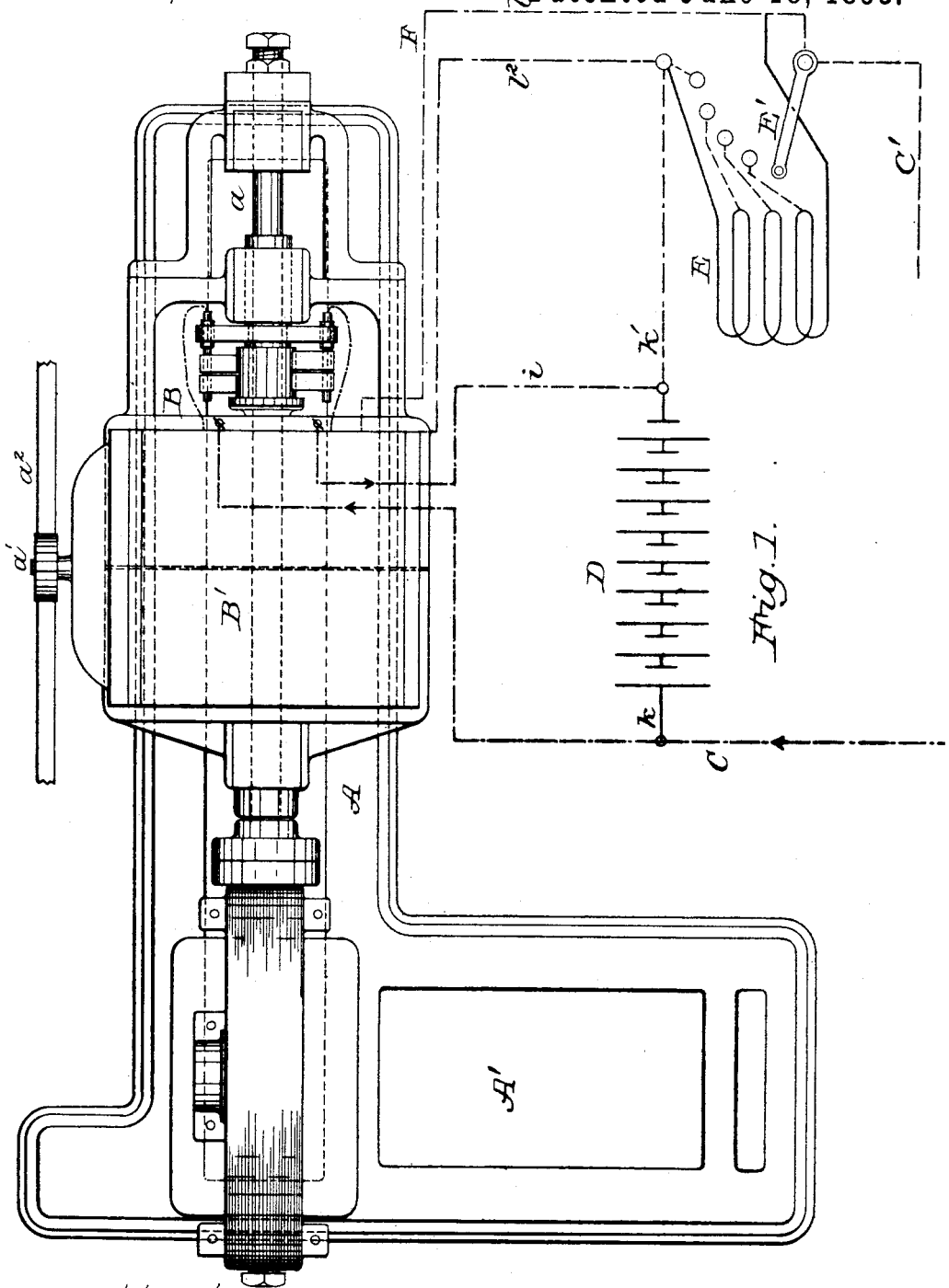

(No Model.)

2 Sheets—Sheet 1.

R. EICKEMEYER.
ELECTRIC ELEVATOR.

No. 541,200.  Patented June 18, 1895.

Attest:
Philip F. Larner
Howell Hastle

Inventor:
Rudolf Eickemeyer
By Wm. C. Mead
Attorney

THE NORRIS PETERS CO., PHOTO-LITHO., WASHINGTON, D. C.

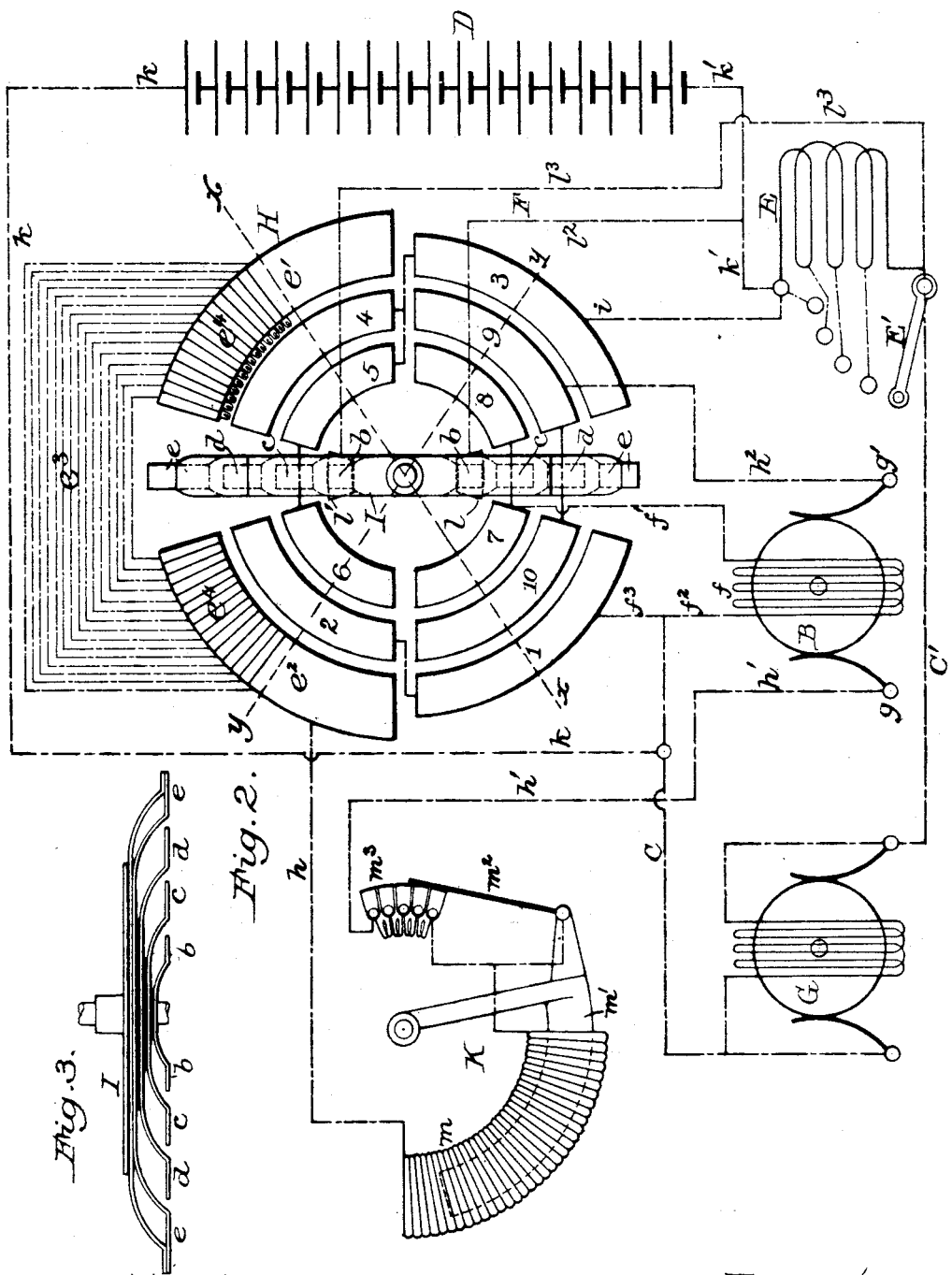

UNITED STATES PATENT OFFICE.

RUDOLF EICKEMEYER, OF YONKERS, NEW YORK.

ELECTRIC ELEVATOR.

SPECIFICATION forming part of Letters Patent No. 541,200, dated June 18, 1895.

Application filed October 1, 1890. Serial No. 366,743. (No model.)

*To all whom it may concern:*

Be it known that I, RUDOLF EICKEMEYER, of Yonkers, in the county of Westchester and State of New York, have invented certain new and useful Improvements in Electric Elevators; and I do hereby declare that the following specification, taken in connection with the drawings furnished and forming a part of the same, is a clear, true, and complete description of my invention.

In my application for Letters Patent, filed May 14, 1890, Serial No. 351,753, (see Letters Patent No. 454,462, dated June 23, 1891,) I described certain improvements in electric elevators, which have had their practical value amply demonstrated in practical service, when considered with special reference to elevator duty; but under certain quite prevalent conditions in commercial or dynamo electric circuits, some difficulties have been encountered, in the way of impairing the efficiency, and operation, of more or less remote motors, electric lights, &c., supplied from the same circuit, which includes an electric elevator, and especially, when such a circuit is being worked nearly, or quite up to, the capacity of the mechanically operated electric generators.

The operation of an elevator, with its prompt starting, and stopping, causes objectionable fluctuating effects, throughout the circuit, and a more or less variable operation, of all other electric apparatus in the circuit, and the prime object of my invention, is to obviate said effects, coupled with prompt, and efficient operation of the elevator.

I provide for a desirable uniform potential condition, in a line or commercial circuit, by employing in connection with each elevator motor, accumulators, or storage batteries, of such size and number, and of such internal resistance, as will be in proper proportion to the resistance of the motor, to enable it when in operation, to be in part supplied from the line, and in part from the accumulators. I have also so introduced a resistance into the line, that the accumulators can favorably operate in supplying the motor, and said resistance may be graduated, or adjusted for varied operation under frequent contingencies; and I have still further so organized the accumulators with the motor switch, that when the latter is set for stopping the elevator, the resistance is cut out, and the full power of the line or circuit will be applied to the charging of the accumulators, until the motor is next started. In my said prior application, I described in the armature circuit of a shunt wound motor, a resistance which is so far automatic in its operation, that it gradually cuts out resistance in said circuit, in proportion as counter electro motive force is developed in the motor, and hence said automatic resistance is now interposed between the reinforcing source of supply, and the motor armature.

Referring to the drawings, Figure 1, Sheet 1, in plan view illustrates so much of my electric elevating mechanism as is deemed necessary for the purposes of this specification, in connection with the external apparatus and electric connections involved in my present improvements. Fig. 2 illustrates the switchboard of the motor, with a diagrammatic view of the entire electrical apparatus. Fig. 3 is a side view of the switch-bar.

In Fig. 1, I have shown the bed plate A, of such elevating mechanism as I have organized to be operated by electricity, the motor B, driving a worm shaft $a$, geared to the hoisting and lowering winch or drum, not here shown, it being understood that said drum is mounted at the space A' provided for its reception on the frame or bed plate A. The switching mechanism is contained within a switch box B', usually on top of the motor, and it is operated by way of a rock shaft, having a pinion $a'$, which meshes with a segmental gear lever $a^2$, vibrated by means of the usual hand line, within an elevator carriage, and it is operated in a manner common to ordinary elevator mechanism. The supply line wires are indicated at C, and C'; a set of accumulators at D; a line resistance at E, and a shunting circuit at F. The entire electrical apparatus is fully illustrated on Sheet 2, Fig. 2, with the addition of an electric generator G, coupled to the line wires C, and C', each of the parts already referred to being designated by the same letters and numerals of reference as are used in Fig. 1.

I will first describe the switch board H, and its bar I, Fig. 3. Said board embodies twelve curved or segmental shaped contact blocks, arranged in three concentric lines, and two shunting contact blocks, within the inner line.

The switch bar I, is centrally pivoted, and has four spring brushes of varied lengths, commencing with $b$, the shortest, then $c$, $d$, and $e$, the latter being the longest. The outer contact blocks $e'$, and $e^2$, are coupled together by conductors $e^3$, and corresponding resistance bars $e^4$. The contact block 1, is in the outer line, and block 2, is in an inner line, but at their adjacent ends they are electrically connected. The contact block 3, in the outer line, is connected electrically at one end with the adjacent ends of blocks 4, and 5, which respectively occupy different inner lines, and block 5, is electrically connected with block 6 in the same line. Two interior blocks 7, and 8, are connected electrically with each other, and also with one terminal of the field coil $f$, of the motor B, by the conductor $f'$, the other terminal $f^2$, of said coil, having connection with the circuit line wire C, leading from one terminal of the generator G, which is also in connection with the contact block 1, at $f^3$. The pair of contact blocks $e'$ and $e^2$, and the pair 9 and 10, are respectively connected with the two terminals or brushes $g$ and $g'$, of the armature circuit of the motor B; the said block $e^2$ by way of conductor $h$, through the automatically operated resistance K, thence by conductor $h'$ connects with the motor terminal $g$, and the conductor $h^2$, connects the terminal $g'$, with blocks 9, and 10. The block 3, by way of a conductor $i$, has its electric exit to the line C', either through, or shunted past, the line resistance E.

The circuit of the accumulator batteries D, extends by way of a conductor $k$, from the incoming line wire C, to one battery terminal, and from the other terminal by way of conductor $k'$, to the resistance E. The accumulators, are by means of a circuit, at F, shunted past the said resistance, by the operation of the switch bar, its lower and shortest brush $b$, connecting two small contact blocks $l$, and $l'$, which are respectively connected, by conductors $l^2$, and $l^3$, with the accumulator terminal conductor $k'$, and the outgoing line wire C', beyond the resistance E. The line wire resistance E, is adjustably controlled by means of a switch key E', in the line, which enables all of the resistance to be thrown in, as when in the position shown, or it can cut out all, or any portion of the resistance, the circuit being opened by way of either of the small contact blocks, and the key, all in a manner common to many resistances, in other organizations.

The armature circuit resistance K is described in my aforesaid application, and for the purposes of this specification, it need only be described as embodying a curved solenoid $m$, a pivotally supported curved core $m'$, carrying a brush $m^2$, which, as the core moves, is caused to sweep over the faces of the contact blocks $m^3$, in the resistance. In my complete apparatus, when the switch board bar is moved in either direction, for starting the motor, it mechanically forces the core into the solenoid, and the latter maintains control thereof, and automatically releases it, in proportion to the development of counter electro motive force in the motor, thus commencing always with all of the resistance applied in the armature circuit, and then gradually cutting it out, as rapidly as will be safe, and proper, for the current to be applied to the armature.

The matter of mechanically forcing the core $m'$, inwardly, is quite independent of the improvements herein described, it being immaterial in this connection, how or by what means said core is put into a position, from which it is automatically released, for automatically cutting out the resistance K.

As shown in the drawings, the switch bar I, is engaged with none of the segmental blocks, but the brush $b$, is on the small blocks $l$, $l'$, and hence there is a direct circuit from line wire C, to C', through the accumulators by way of conductor $k$, $k'$, and the shunt circuit F which includes the conductor $l^2$, brush $b$, and conductor $l^3$; thus, while the motor is at rest, enabling the accumulators to be charged under favorable conditions. If the bar I, be swung toward the right hand, its brush $c$, will couple the contact block 7, with 5, and 3, and thence with line C', thus putting the field coil $f$, of the motor into circuit. Then the brush $d$, will couple the block 10 with 4 and 3, and thence with line C', thus connecting the armature terminal $g'$, with line C', by way of conductor $h^2$ to block 9, and thence to 10, and then as already described. The still further movement of the bar I, puts its outer brush $e$, in contact with block 1, conveying current to the resistance bars $e^4$ of block $e'$, thence making circuit by way of conductors $e^3$ to block $e^2$, thence by conductor $h$, through the automatic resistance K, to conductor $h'$, thus conducting the electric current to the other terminal $g$, of the motor armature; and when the bar occupies a position indicated by line $x$, the motor will be driven at its full power, in one direction, the shunt circuit F, having meantime been opened, thus putting in the line resistance E, and enabling the accumulator to contribute to the operation of the elevator, to such an extent as may be determined at will, by cutting out more, or less of the resistance, at the switch key E'. For stopping the elevator, the switch bar is removed to its original position, thereby short circuiting the resistance E, and enabling the current from line C, to efficiently charge the accumulators.

For causing the motor to revolve in a direction opposite to that last described, the bar I, will be swung toward the left hand, or line $y$. The shunt circuit F, will be closed as before, putting in the resistance E, between the accumulators and line C'.

The brush $c$, will couple the block 6 with the block 8, thence by way of block 7 and conductor $f'$, to one terminal of the motor field coil $f$, and block 6, communicates with block 5, thence to 3, and thence by way of conductor $i$, to line wire C', thus completing the field coil circuit, the current passing therein, in the same direction as before described. The brush $d$, will then take current from block 2, conduct it thence to block 9, and thence by conductor $h^2$, to terminal $g'$, of the motor; the circuit from the motor terminal $g$, being then through the automatic resistance $K$, by conductors $h'$, and $h$, to block $e^2$; thence by brush $e$, to block 3, out by way of conductor $i$, to line wire $C'$, through the resistance $E$, or any portion of it, not shunted, by way of the key $E'$.

It will be seen, that by variations in the adjustment of the resistance $E$, the accumulators may be made to contribute more or less to the driving of the elevator motor, and that the accumulators, serve to maintain an equilibrium of potential in the line, both upon stopping, and starting the elevator. These results are accomplished as follows: There are two complete circuits for the elevator motor. The generator circuit commencing with the line wire $C$, includes the conductor at $f^2$, $f^3$, the switch $H$, the motor $B$, and conductor $i$, to line wire $C'$, either through the resistance $E$, or shunted therefrom by its key $E'$. The accumulator or secondary battery circuit, includes the battery $D$, the conductor $k$ from one terminal, a part of line wire $C$, conductor $f^2$, $f^3$, the motor $B$, switch $H$, and conductors $i$ and $k'$, the latter being the other terminal of the battery $D$.

Should no current from the generator $G$ be supplied, and the secondary battery be charged, the motor $B$ could then be operated and controlled by the switch $H$.

If the battery were cut out, the generator could of course be wholly relied upon for driving the motor, and if the battery were charged, and the full current from the generator delivered to the motor, the battery would only serve to maintain uniform potential in the line, and especially during the starting and stopping of the motor. If, however, the battery were charged, and a portion of the resistance $E$ should then be thrown into the generator circuit so that the current received from the generator $G$ would be less than the elevator motor required, the battery would then furnish the necessary additional current for driving the motor. The resistance $E$ therefore, in controlling the current in the generator circuit, also controls the current in the secondary battery circuit.

Although a variable resistance is shown, it is to be understood that it is only for enabling a definite adjustment according to the respective currents which the generator and the accumulator are to furnish in any one apparatus.

It is to be understood, that although I have herein illustrated my invention in connection with electrically operated elevating mechanism, I believe I am the first, to employ in a circuit for operating an electric motor, a storage battery or accumulator, which is charged only while the motor is at rest, and which yields the stored energy for service in starting the motor. I also believe, I am the first to employ an automatically released resistance in the armature circuit of a motor, driven both by initial, and by stored energy; and also the first to introduce a resistance, whether fixed or variable, for graduating the supply of energy supplied to the motor, from the accumulator, and providing for the shunting of said resistance, when the motor is at rest.

Having thus described my invention, I claim as new and desire to secure by Letters Patent—

1. In electrically operated elevating mechanism, the combination substantially as hereinbefore described, of an electric shunt wound motor, supplied with electricity from a mechanically operated generator by way of suitable circuit wires; accumulators or storage batteries connected with said circuit or line wires; a resistance between the appropriate terminal of the accumulators, and one of the line wires; and shunt circuit wires, and a switch, for cutting out said resistance when the motor is at rest, whereby power is stored while the elevator is not in motion, and a practically uniform potential maintained in the circuit, regardless of frequent stopping and starting, as well as of the wide variations in loads on the motor incident to elevator service.

2. In electrically operated elevating mechanism, the combination substantially as hereinbefore described, of a shunt wound electric motor; a set of accumulators which are charged from the main circuit from which the motor is supplied; and a resistance in the main circuit, whereby the current supplied to the motor from the main circuit, will be reduced by said resistance, and additional current supplied from the accumulators for driving the motor.

3. In electrically operated elevating mechanism, the combination of a shunt wound electric motor; appropriate supply circuit wires; a set of accumulators or storage batteries connected with said circuit wires; a resistance interposed between the accumulators and one of said wires; shunt circuit wires for cutting out said resistance; and a switch board and bar for stopping, starting and reversing the motor, and cutting out said resistance simultaneously with the stopping of the motor.

4. In electric elevating mechanism, the combination substantially as hereinbefore described, of an electric motor driven by power derived from commercial circuit wires; accumulators or storage batteries, in line with said wires; a resistance between said accumulators and the return circuit wire; shunt circuit wires for cutting out said resistance; an automatically operated resistance in the armature circuit of the motor; and a switch board and bar for stopping, starting and reversing the motor, and also cutting out and putting in the return wire resistance simultaneously with the stopping and starting of the motor, both of said resistances and the accumulators cooperating to maintain a practically uniform potential in the commercial circuit during the varied operations of elevating mechanism.

5. In combination with elevator mechanism, a shunt wound electric motor and the line wires by which it is supplied with electricity; accumulating batteries connected with and charged by said line wires; suitable electric connections; and switching mechanism which when moved in opposite directions will afford reversed currents in the armature of the motor, and non reversed currents in the field coil; and which, wholly cuts the motor from the line when the motor is at rest, and affords an unobstructed circuit from one line wire to the other, except through the accumulators, and which also enables the accumulated energy to unite with that from the appropriate line wire during the starting of the motor.

6. In combination with elevator mechanism, a shunt wound electric motor; an armature circuit supplied from generators and accumulators, and a resistance which is automatically adjustable to counter electro motive force as it is developed in the motor, substantially as described.

RUDOLF EICKEMEYER.

Witnesses:
JAMES S. FITCH,
RUDOLF EICKEMEYER, Jr.